(12) United States Patent
Watanabe et al.

(10) Patent No.: US 6,686,722 B2
(45) Date of Patent: Feb. 3, 2004

(54) BATTERY PACK CONTAINING A CIRCUIT BREAKER

(75) Inventors: Atsushi Watanabe, Tsuna-gun (JP); Mikitaka Tamai, Tsuna-gun (JP); Hiroki Teraoka, Mihara-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/106,049

(22) Filed: Mar. 27, 2002

(65) Prior Publication Data

US 2002/0140401 A1 Oct. 3, 2002

(30) Foreign Application Priority Data

Mar. 30, 2001 (JP) ........................................ 2001-101363

(51) Int. Cl.7 .............................................. H01M 10/46
(52) U.S. Cl. ..................................................... 320/112
(58) Field of Search ................................ 320/110, 107, 320/112, 134, 136; 479/96, 99, 100; D13/103

(56) References Cited

U.S. PATENT DOCUMENTS

| | | | | |
|---|---|---|---|---|
| 5,403,782 A | * | 4/1995 | Dixon et al. | |
| 5,451,715 A | * | 9/1995 | Hundt et al. | |
| 5,498,903 A | * | 3/1996 | Dixon et al. | |
| 5,647,121 A | * | 7/1997 | McLellan et al. | |

* cited by examiner

*Primary Examiner*—Edward H. Tso
(74) *Attorney, Agent, or Firm*—Wenderoth, Lind & Ponack, L.L.P.

(57) ABSTRACT

The battery pack has batteries, a printed circuit board with battery protection circuit components mounted on it, and a circuit breaker contained in a case. The circuit breaker switches off if excessive current flows in the batteries, or if battery temperature exceeds a specified temperature. The circuit breaker has a plurality of solder terminals attached to its casing, and one or a plurality of the solder terminals are attached to the printed circuit board by solder re-flow. The printed circuit board is connected to the batteries via leads and is disposed in a fixed position inside the case. The circuit breaker is mounted in a fixed position inside the case via the printed circuit board.

27 Claims, 12 Drawing Sheets

BATTERY PACK CONTAINING A CIRCUIT BREAKER

This application is based on application No. 101363 filed in Japan on Mar. 30, 2001, the content of which incorporated hereinto by reference.

BACKGROUND OF THE INVENTION

This invention relates to a battery pack containing a circuit breaker which cuts-off current flow if excessive current flows through the batteries or if battery temperature rises abnormally.

A battery pack containing a circuit breaker protects the batteries by cutting-off the current when excessive current flows through the batteries or when battery temperature rises abnormally. There are two types of circuit breakers. There are circuit breakers which switch on and off via movable contacts, and there are circuit breakers which abruptly change electrical resistance with temperature such as PTC devices. A movable contact circuit breaker contains a bimetal element which heats as a result of current flow. The bimetal element is heated by current flow induced Joule-heating and switches the movable contact from the on to off position to cut-off current flow. A PTC device abruptly increases its electrical resistance when temperature rises to almost eliminate current flow.

Figure 1:
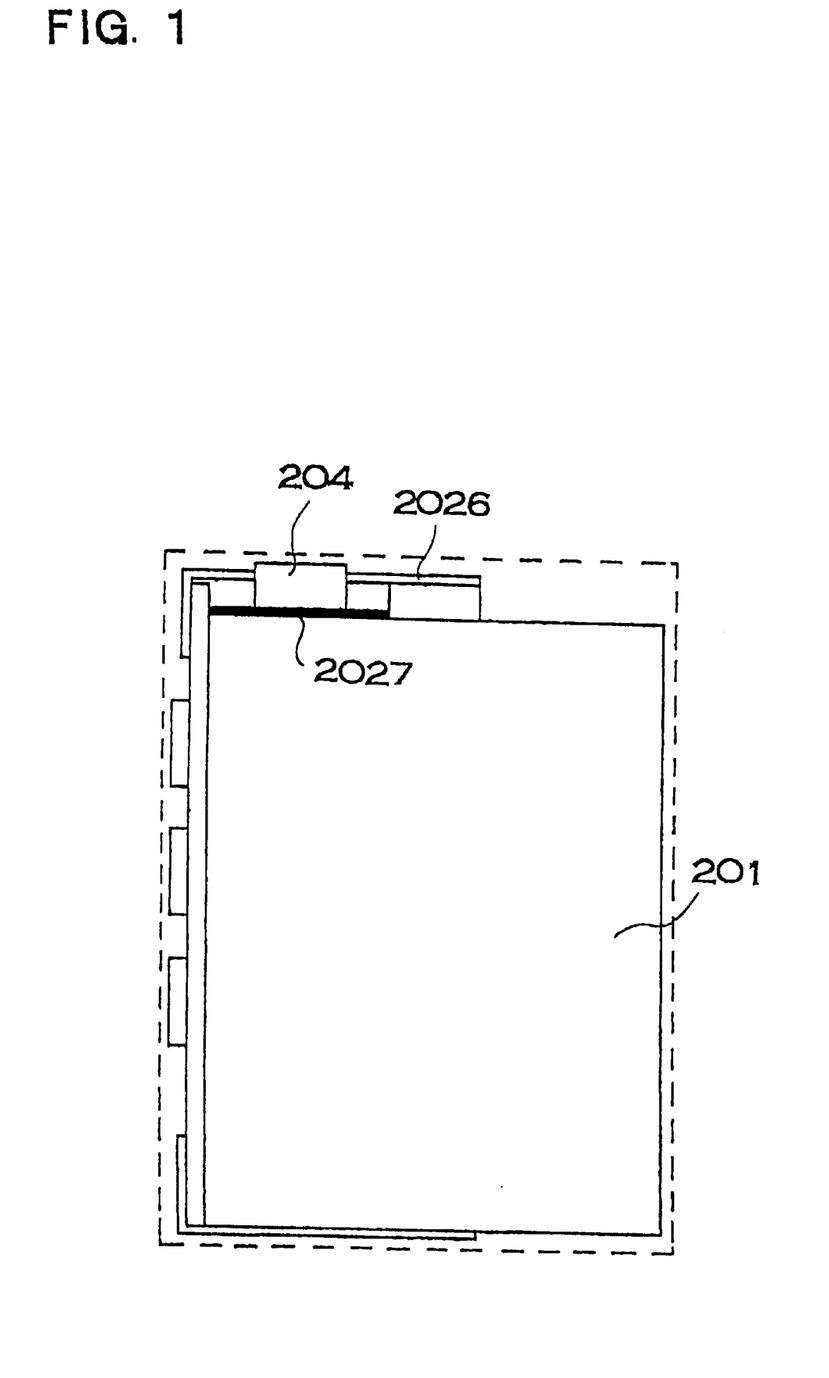
FIG. 1 is an abbreviated cross-section view of a related art battery pack containing a circuit breaker.

FIG. 1 shows a battery pack containing a circuit breaker 4. In the battery pack shown in this figure, circuit breaker 204 leads 2026 are connected to the batteries 201. The circuit breaker 204 is disposed in close proximity to battery surfaces for quick current shut-off. Insulating sheet 2027 is disposed between the circuit breaker 204 and the batteries 201 to prevent short circuit caused by a lead 2026, from the closely positioned circuit breaker 204, touching a battery 201.

To accurately position the circuit breaker 204 in a battery pack with circuit breaker 204 leads 2026 connected to the batteries 201 as shown in FIG. 1, extra effort is required during assembly. Further, this system has the drawback that the circuit breaker 204 can easily be out of position. Circuit breaker position affects its current shut-off characteristics. This is because the circuit breaker is heated by battery current flow as well as by heat from the batteries. If the circuit breaker is further away from the batteries, heat conduction from the batteries to the circuit breaker is reduced and turning the circuit breaker off becomes more difficult. In contrast, if the circuit breaker is closer to the batteries, heat conduction improves and the circuit breaker is more easily turned off. Therefore, the relative position of the circuit breaker and the batteries changes circuit breaker current shut-off characteristics. It is required that circuit breaker characteristics show reliable current shut-off at preset conditions. Realization of an ideal battery pack is impossible if circuit breaker cut-off action is either too slow or too fast. If circuit breaker shut-off is too slow, batteries cannot be sufficiently protected, battery characteristics can degrade, and battery internal pressure can become abnormally high. In contrast, if circuit breaker shut-off is too fast, the battery pack cannot be used under conditions which should allow battery pack use.

The present invention was developed to eliminate the drawbacks described above. Thus it is a primary object of the present invention to provide a battery pack allowing accurate circuit breaker positioning along with ease of assembly thereby resulting in precise circuit breaker action, effective battery protection, and safe operation.

The above and further objects and features of the invention will more fully be apparent from the following detailed description with accompanying drawings.

SUMMARY OF THE INVENTION

The battery pack of the present invention is provided with a case, batteries housed inside the case, a printed circuit board, and a circuit breaker. Battery protection circuit components are mounted on the printed circuit board. The circuit breaker is connected in series with the batteries and switches off to protect the batteries if excessive current flows through the batteries or if battery temperature rises above a set temperature. The circuit breaker has a plurality of solder terminals attached to the circuit breaker casing. One, or a plurality of the solder terminals are attached to the printed circuit board by solder re-flow. The printed circuit board is connected to the batteries via leads and is also disposed in a fixed position inside the case. The circuit breaker mounts in a fixed position inside the case via the printed circuit board.

This battery pack configuration has the characteristic that assembly is simplified and the circuit breaker can be disposed at a precise position. This is because circuit breaker solder terminals are attached to the printed circuit board by solder re-flow, and the printed circuit board is disposed in a fixed position. This system of solder re-flow attachment of circuit breaker solder terminals to the printed circuit board has the characteristic that manufacturing complexity is avoided and simplification is possible. Further, since the printed circuit board, with circuit breaker attached, is connected to the batteries via leads and disposed in a fixed position, the circuit breaker, which is positioned via the printed circuit board, can always maintain a consistent position relative to the batteries and can be disposed in an ideal location. In this fashion, a battery pack, in which the circuit breaker can always be disposed at a precise location, increases circuit breaker thermal sensitivity, allows accurate circuit breaker operation, and effectively protects the batteries to allow safe operation.

The circuit breaker preferably has solder terminals at both ends of its casing, and those solder terminals are firmly attached to the printed circuit board by solder re-flow. In addition, the circuit breaker may have a solder terminal and a lead attached to its casing. The solder terminal can be re-flow soldered to the printed circuit board for attachment and the lead can be connected to a battery electrode. A circuit breaker type containing a current cut-off contact which switches from on to off with excessive current or temperature can be used for this circuit breaker.

The printed circuit board is preferably disposed in a fixed position facing the surfaces of the batteries and providing a gap between the batteries and the printed circuit board for the circuit breaker. The circuit breaker can be mounted within this gap. Further, the circuit breaker can be disposed to put the surface of its casing in close proximity to the surfaces of the batteries. In particular, the circuit breaker can be disposed in direct contact with the surfaces of the batteries. The printed circuit board can be mounted via a holder in a fixed position relative to the surfaces of the batteries.

DETAILED DESCRIPTION OF THE INVENTION

Figure 2:
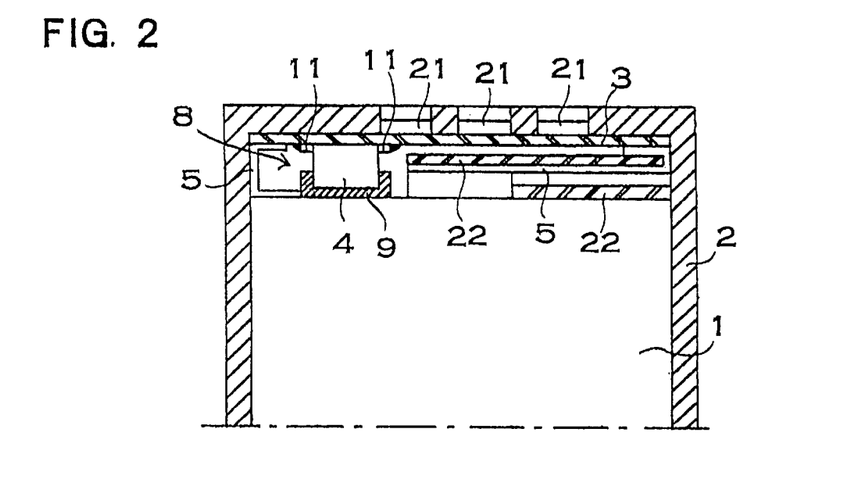
FIG. 2 is an abbreviated cross-section view of an embodiment of a battery pack of the present invention.
Figure 3:
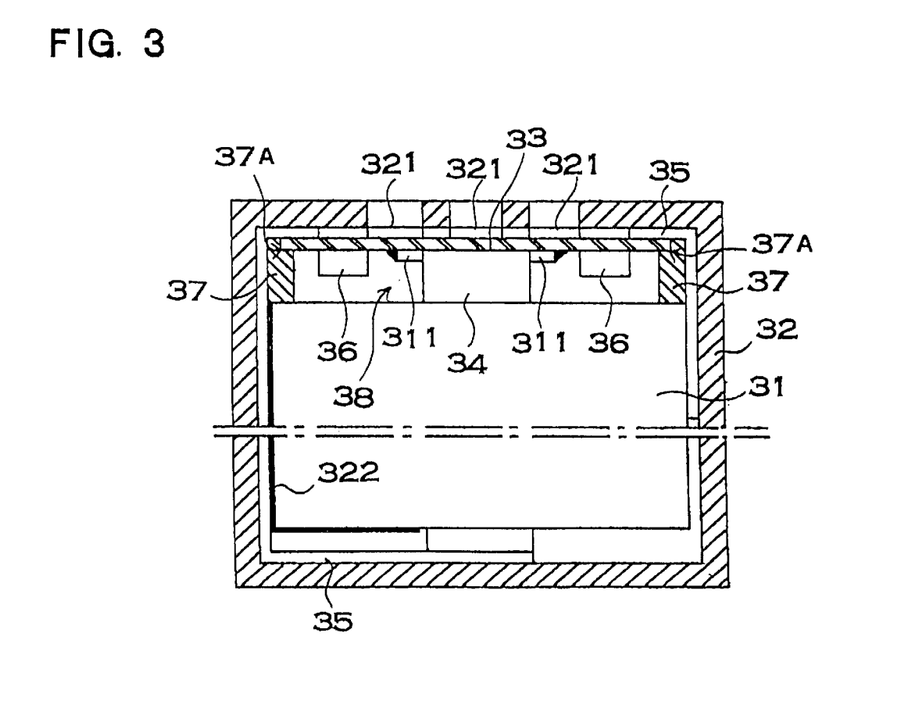
FIG. 3 is an abbreviated cross-section view of another embodiment of a battery pack of the present invention.

The battery packs shown in FIGS. 2 and 3 contain batteries 1, 31, a printed circuit board 3, 33, and a circuit breaker 4, 34 inside a case 2, 32. The batteries 1, 31 are rechargeable batteries such as lithium ion rechargeable batteries, nickel hydrogen batteries, nickel cadmium batteries, or polymer batteries. The battery pack of the figures contains thin outline batteries. Circular cylindrical batteries may also be used. Further, the battery pack contains one or a plurality of batteries inside the case.

The printed circuit board 3, 33 is disposed at a battery 1, 31 end region. The printed circuit board 33 has battery 31 protection circuit components 36 mounted on it. The battery 31 protection circuit, comprising protection circuit components 36 mounted on the printed circuit board 33, prevents battery 31 overcharge or over discharge to prevent battery 31 degradation. The protection circuit is provided with a circuit to detect remaining battery capacity and voltage, and a switching device that is switched on or off by that circuit. The protection circuit switches the switching device off to cut off battery 31 current if the battery 31 goes into an overcharge or over discharge condition.

In the battery packs of the figures, the printed circuit board 3, 33 is disposed facing battery 1, 31 surfaces. The printed circuit board 3, 33 is disposed in a fixed position that establishes a gap 8, 38 between the batteries 1, 31 and the printed circuit board 3, 33 for mounting the circuit breaker 4, 34. The circuit breaker 4, 34 is mounted in this gap 8, 38 to put the surface of the circuit breaker 4, 34 casing in close proximity to the battery 1, 31 surfaces. In the battery pack of FIG. 2, the printed circuit board 3, 33 is connected to the batteries 1, 31 via leads 5, 35. In the battery packs of the figures, insulating spacers 22, 322 are provided to prevent leads from touching the batteries 1, 31 or the surface of the printed circuit board 3, 33.

The battery pack of FIG. 3 is provided with a holder 37 between the printed circuit board 33 and the batteries 31. The holder 37 has an insertion section 37A to hold the printed circuit board 33 in a fixed position. The printed circuit board 33 inserts into the holder's 37 insertion section 37A and is retained in a fixed position. The printed circuit board 33, held in place by the holder 37, is connected to the batteries 31 by leads, and is maintained in a fixed position by both the holder 37 and the leads. Although not illustrated, printed circuit board and battery retaining insertion sections may also be provided on the inside walls of the case to dispose the printed circuit board and batteries in fixed positions inside the case. Further, the printed circuit board may also be bonded to the batteries and case with thermal conducting resin to mount it in a fixed position. A printed circuit board mounted via thermal conducting resin may have the circuit breaker and other elements which are attached to the printed circuit board also bonded to the batteries. This configuration is characterized by allowing effective thermal conduction of battery heat to the circuit breaker.

Thermal conducting resin is bonding resin which can electrically insulate and bond the printed circuit board to the batteries. For example, epoxy family bonding resins are applicable. In the battery pack of FIG. 2, the surface of the printed circuit board 3 facing the batteries 1 is the side with the circuit breaker 4 attached, and the circuit breaker 4 is bonded to the batteries with thermal conducting resin 9. Battery 1 heat can be effectively transmitted to the circuit breaker 4 via thermal conducting resin 9 with this type of battery pack structure. Consequently, this system has the characteristic that when the batteries 1 are heated, battery heat is effectively transmitted to the circuit breaker 4, and the circuit breaker 4 can quickly respond with current cut-off. However, as shown in FIG. 3, the circuit breaker 34 can also be disposed to directly touch a battery surface and battery 31 heat can be effectively transmitted to the circuit breaker 34.

Figure 4:
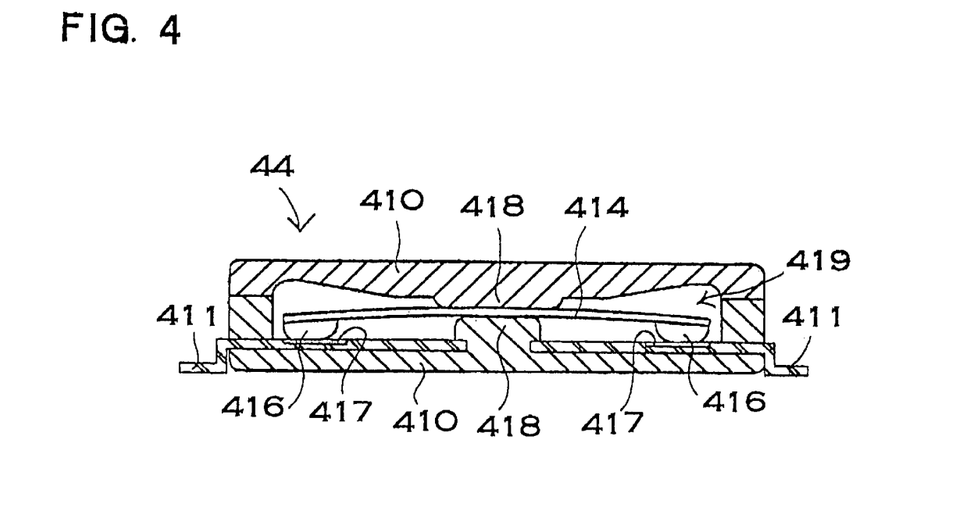
FIG. 4 is a cross-section view showing one embodiment of a circuit breaker housed inside a battery pack.
Figure 5:
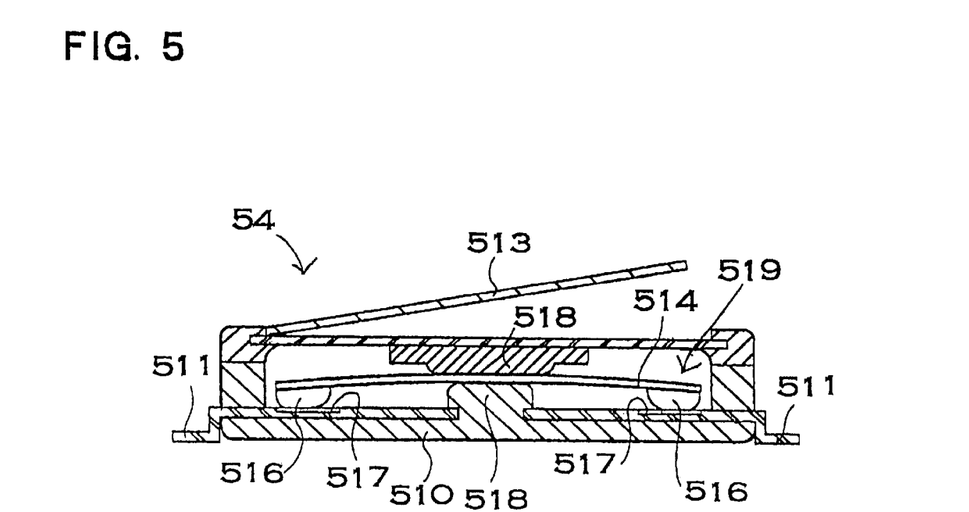
FIG. 5 is a cross-section view showing another embodiment of a circuit breaker housed inside a battery pack.

As shown in FIGS. 4 through 12, a circuit breaker has solder terminals 411, 511, 611, 711, 811, 911, 1011, 1211 attached to its casing 410, 510, 610, 710, 810, 910, 1010, 1210. The casing 410, 510, 610, 710, 810, 910, 1010 is formed from plastic. However, the casing is not required to be made entirely from plastic. The circuit breakers 54, 124 shown in FIGS. 5 and 12 have a casing 510, 1210 in which one part is a flexible metal plate 513, 1213. The flexible metal plate 513, 1213 is joined to the top of the casing 510, 1210 protruding outward in a flexible fashion. The flexible metal plate 513 shown in FIG. 5 is configured with one side connected to the casing 510 and the other end protruding outward from the casing 510. The flexible metal plate 1213 shown in FIG. 12 has an overall curved shape with its center region protruding outward in a resilient fashion. By disposing these types of circuit breakers 54, 124 in close proximity to the batteries, their flexible metal plates 513, 1213 can be pressed resiliently against battery surfaces. Therefore, battery heat can be effectively transmitted to the circuit breaker 54, 124.

Solder terminals 411, 511, 611, 711, 811, 911, 1011, 1211 are provided in the same plane as the bottom of the casing 410, 510, 610, 710, 810, 910, 1010, 1210 and projecting from the outer sides of the casing 410, 510, 610, 710, 810, 910, 1010, 1210, or are provided fixed to the bottom of the casing 10. The solder terminals 411, 511, 611, 711, 811, 911, 1011, 1211 are attached to the printed circuit board by solder re-flow. The circuit breaker 44, 54, 64, 74, 84, 94, 104, 124 is attached to the printed circuit board 3, 33 via these solder terminals 411, 511, 611, 711, 811, 911, 1011, 1211. Since the circuit breakers 4, 34 of FIGS. 2 and 3 have solder terminals 11, 311, attached at both ends of their casings, fixed to printed circuit boards 3, 33 by solder re-flow, they can be firmly and reliably mounted on the printed circuit boards 3, 33. The circuit breaker 4, 34 is electrically connected between battery pack output terminals 21, 321 fixed to the printed circuit board 3, 33 and the batteries 1, 31. Consequently, if the circuit breaker 4, 34 shuts off, output terminals 21, 321 are disconnected from the batteries 1, 31, and battery 1, 31 current is cut off.

A circuit breaker 4, 34 with a plurality of solder terminals 11, 311 projecting from its outer sides has solder terminals 11, 311 projecting from both ends. This type of circuit breaker 4, 34 has the characteristic that it can be firmly and reliably mounted on a printed circuit board 3, 33.

Figure 6:
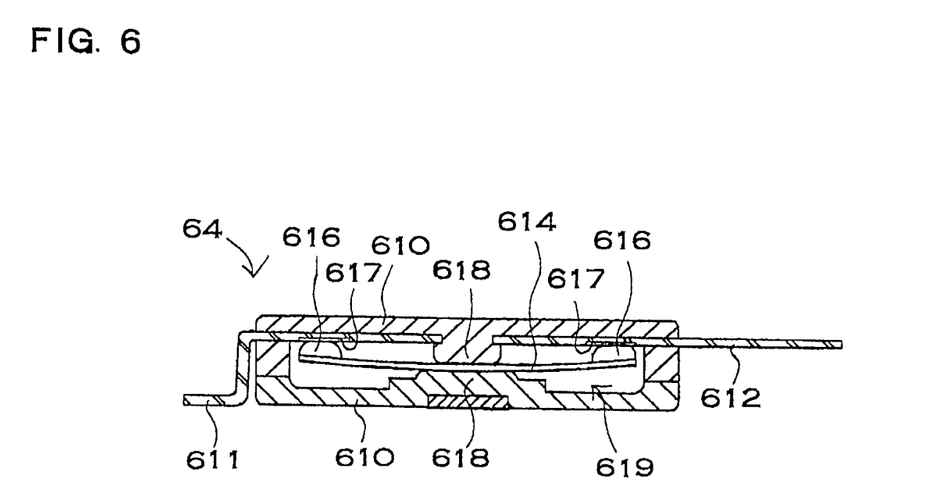
FIG. 6 is a cross-section view showing another embodiment of a circuit breaker housed inside a battery pack.
Figure 13:
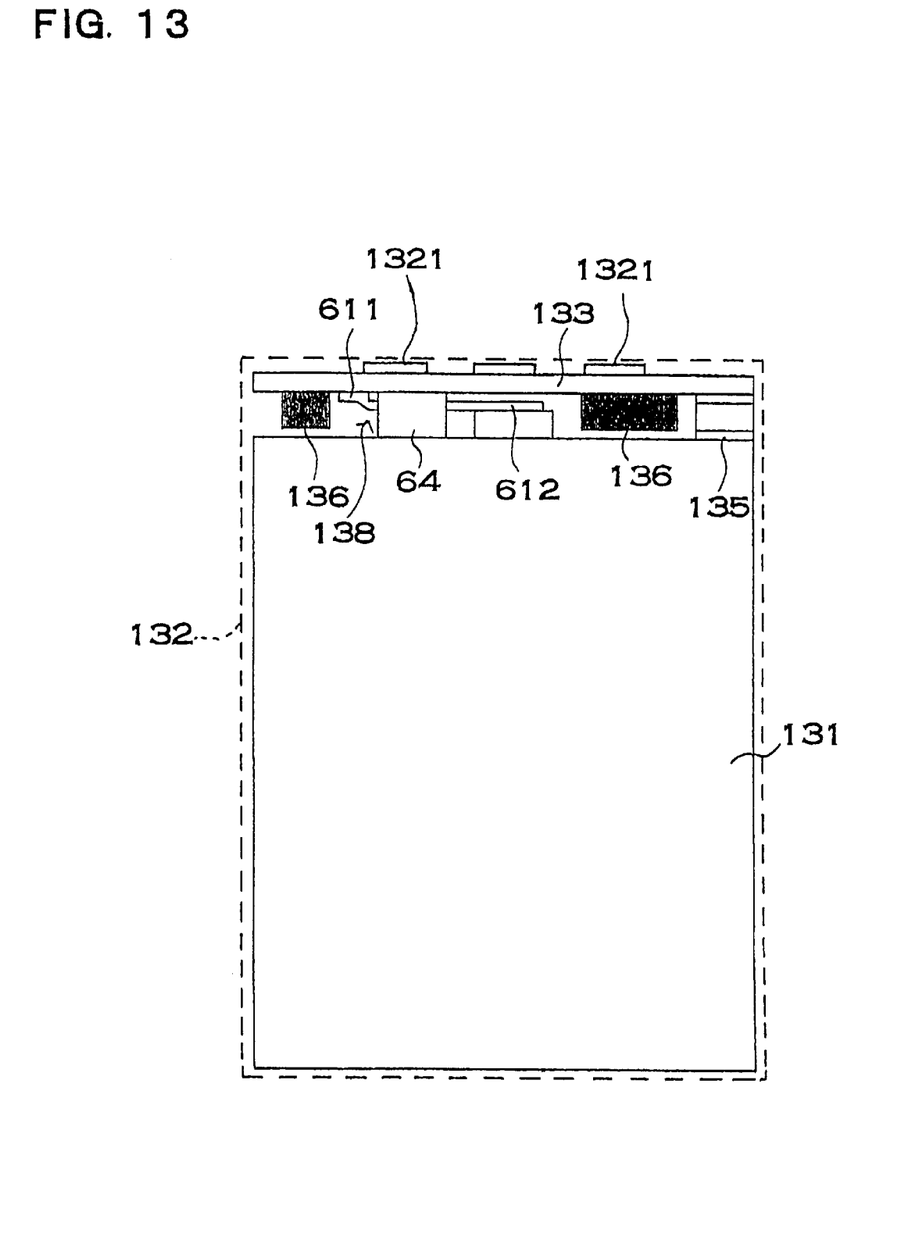
FIG. 13 is a cross-section view showing one embodiment of a battery pack containing the circuit breaker shown in FIG. 6.
Figure 14:
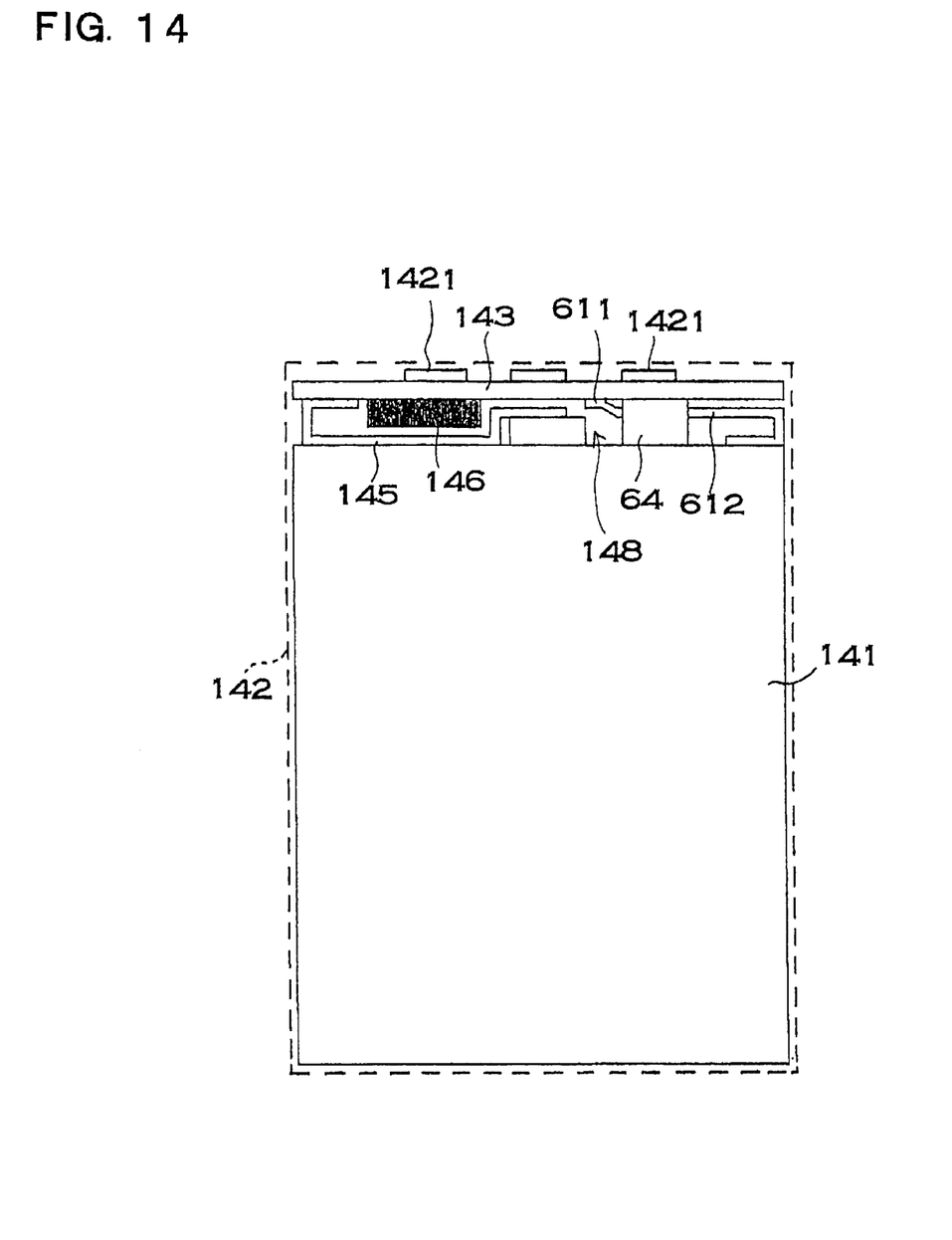
FIG. 14 is a cross-section view showing another embodiment of a battery pack containing the circuit breaker shown in FIG. 6.

The circuit breaker 64 shown in FIG. 6 has a solder terminal 611 and a lead 612. The solder terminal 611 and a lead 612 are attached to the casing 610 and project outwards from the casing 610. The solder terminal 611 is attached to the casing 610 in the same plane as the bottom of the casing 610, and the lead 612 projects outward from the middle of the casing 610. As shown in FIGS. 13 and 14, this circuit breaker 64 has its solder terminal 611 attached by solder re-flow to the printed circuit board 133, 143, and has its lead 612 spot welded, or connected by solder re-flow, to the batteries 131, 141. In FIGS. 13 and 14, 132 and 142 are the cases, 135 and 145 are the leads, 136 and 146 are the protection circuit components, 138 and 148 are the gaps, and 1321 and 1421 are the output terminals.

The following describes circuit breaker internal structure. The circuit breakers 44, 54, 64, 74, 84, 94, 104 shown in FIGS. 4 through 11 have current shut off contacts 414, 514, 614, 714, 814, 914, 1014 housed inside their casings 410, 510, 610, 710, 810, 910, 1010. Current shut off contacts 414, 514, 614, 714, 814, 914, 1014 switch off when temperature becomes greater than a set value. A current shut off contact 414, 514, 614, 714, 814, 914, 1014 uses a thermally deforming metal plate, which is a laminate of a plurality of metals with different thermal coefficients of expansion, such as bimetal or tri-metal. When heated, these current shut off contacts 414, 514, 614, 714, 814, 914, 1014 deform in a direction to move a movable contact 416, 516, 616, 716, 816, 916, 1016 away from a fixed contact 417, 517, 617, 717, 817, 917, 1017 for the off state, and when not heated, hold a position keeping the movable contact 416, 516, 616, 716, 816, 916, 1016 touching the fixed contact 417, 517, 617, 717, 817, 917, 1017. The casing 410, 510, 610, 710, 810, 910, 1010 has a cavity 419, 519, 619, 719, 819, 919, 1019 inside to house the current shut off contact 414, 514, 614, 714, 814, 914, 1014. The current shut off contact 414, 514, 614, 714, 814, 914, 1014 is disposed in the cavity 419, 519, 619, 719, 819, 919, 1019 in a position allowing it to switch the movable contact 416, 516, 616, 716, 816, 916, 1016 and the fixed contact 417, 517, 617, 717, 817, 917, 1017 on and off.

The circuit breakers 44, 54, 64 shown in FIGS. 4 through 6 have moveable contacts attached to both ends of the current shut off contacts 414, 514, 614, and are provided with pressure clasps 418, 518, 618 above and below the center region in the figures. The center region of the current shut off contact 414, 514, 614 is bonded into the pressure clasps 418, 518, 618. However, the current shut off contact may also mount in a fixed position, sandwiched by pressure clasps from above and below, while being retained at the specified position by alignment bends or the like, without being bonded to the pressure clasps. Since no special structure is required to mount the current shut off contact 414, 514, 614 in the casing 410, 510, 610 for this type of pressure clasp 418, 518, 618 configuration, the circuit breaker 44, 54, 64 is characterized by an overall thin outline. The fixed contacts 417, 517, 617 are attached to the casing 410, 510, 610 facing the movable contacts 416, 516, 616. The fixed contacts 417, 517, 617 are connected to solder terminals 411, 511, 611 or leads 612 which are brought through both ends of the casing 410, 510, 610 to the outside. When in the unheated state, the current shut off contact 414, 514, 614 holds the movable contacts 416, 516, 616 at both ends in contact with the fixed contacts 417, 517, 617 for the on state. When the current shut off contact 414, 514, 614 is heated, it deforms in a direction to raise both movable contacts 416, 516, 716 away from the fixed contacts 417, 517, 617 and switch the circuit breaker 44, 54, 64 off.

Figure 7:
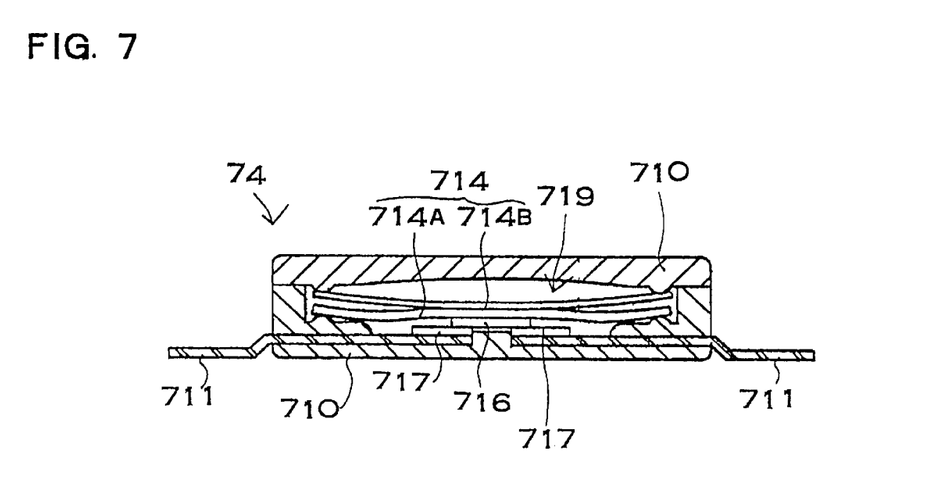
FIG. 7 is a cross-section view showing another embodiment of a circuit breaker housed inside a battery pack.

Turning to the circuit breaker 74 of FIG. 7, the current shut off contact 714 is made up of a flexible contact 714A and a thermally deforming plate 714B. The thermally deforming plate 714B is bimetal or trimetal which is a laminate of metals with different thermal coefficients of expansion. In FIG. 7, a movable contact 716 is attached to the bottom of the flexible contact 714A. In this circuit breaker, a pair of fixed contacts 717 are mutually separated and attached in positions opposite the movable contact 716. The pair of fixed contacts 717 are connected to solder terminals 711 which are brought through both ends of the casing 710 to the outside. When the movable contact 716 on the current shut off contact 714 touches the fixed contacts 717, both solder terminals 711 conduct through the current shut off contact 714 and the circuit breaker 74 turns on. When the movable contact 716 separates from the fixed contacts 717, the circuit breaker 74 turns off. When the current shut off contact 714 is heated, the thermally deforming plate 714B deforms to a shape that does not press down on the flexible contact 714A. At this time, the flexible contact 714A elastically bends in a direction separating the movable contact 716 from the fixed contacts 717 switching the circuit breaker 74 off. The thermally deforming plate 714B is disposed adjacent to the flexible contact 714A, and when it thermally deforms, it allows the flexible contact 714A to bend moving the movable contact 716 away from the fixed contacts 717.

In the circuit breakers 44, 54, 64, 74 described above, when the current shut off contact 414, 514, 614, 714 is heated to a temperature above the set temperature, the movable contacts 416, 516, 616, 716 separate from fixed contacts 417, 517, 617, 717, and the circuit breaker 44, 54, 64, 74 switches off. After being switched off, the circuit breaker 44, 54, 64, 74 resets when it is cooled. The off to on reset temperature is lower than the set temperature for turning the circuit breaker 44, 54, 64, 74 on to off. Thus hysteresis is established between the on and off temperatures.

Figure 8:
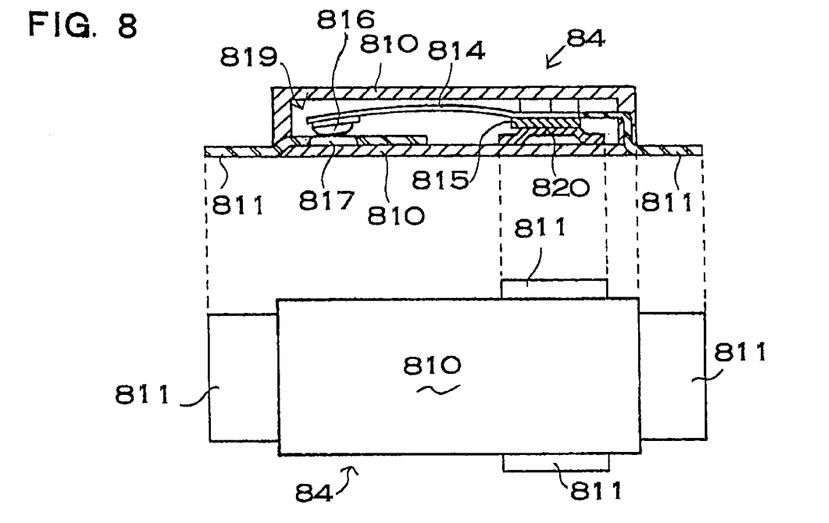
FIG. 8 is a cross-section and plan view showing another embodiment of a circuit breaker housed inside a battery pack.
Figure 9:
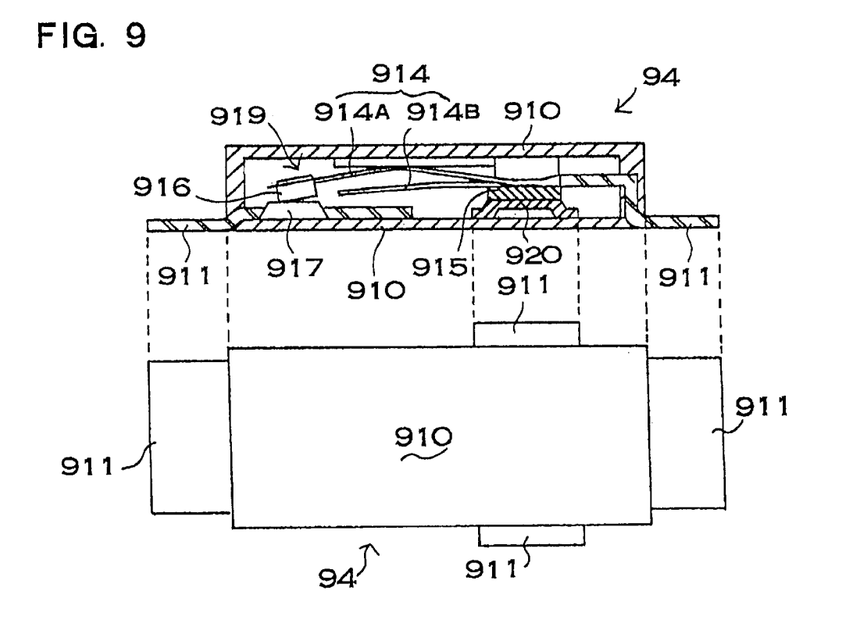
FIG. 9 is a cross-section and plan view showing another embodiment of a circuit breaker housed inside a battery pack.

Turning to the circuit breakers 84, 94 shown in FIGS. 8 and 9, one end of the current shut off contact 814, 914 has a movable contact 816, 916 attached and the other end is attached to the casing 810, 910. In these circuit breakers 84, 94, a fixed contact 817, 917 is connected to the solder terminal on one side and the current shut off contact 814, 914 is connected to the solder terminal on the other side. When the current shut off contact 814, 914 is not heated, it keeps the movable contact 816, 916 in contact with the fixed contact 817, 917 for the on state. When the current shut off contact 814, 914 is heated, it deforms in a direction to raise the movable contact 816, 916 separating the movable contact 816, 916 from the fixed contact 817, 917 to switch the circuit breaker 84, 94 off. The current shut off contact 914 of the circuit breaker 94 of FIG. 9 is made up of a flexible contact 914A and a thermally deforming plate 914B. The thermally deforming plate 914B is bimetal or trimetal which is a laminate of metals with different thermal coefficients of expansion. When the thermally deforming plate 914B of this current shut off contact 914 is heated, it deforms in a direction to push the flexible contact 914A and separate the movable contact 916 from the fixed contact 917. Consequently, the thermally deforming plate 914B is disposed adjacent to the flexible contact 914A allowing it to push the flexible contact 914A and separate the movable contact 916 from the fixed contact 917 when it thermally deforms.

Figure 10:
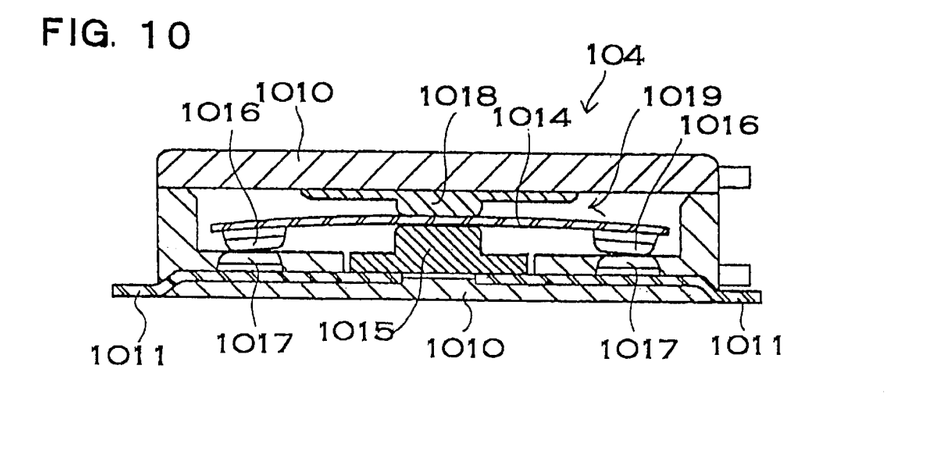
FIG. 10 is a cross-section view showing another embodiment of a circuit breaker housed inside a battery pack.
Figure 11:
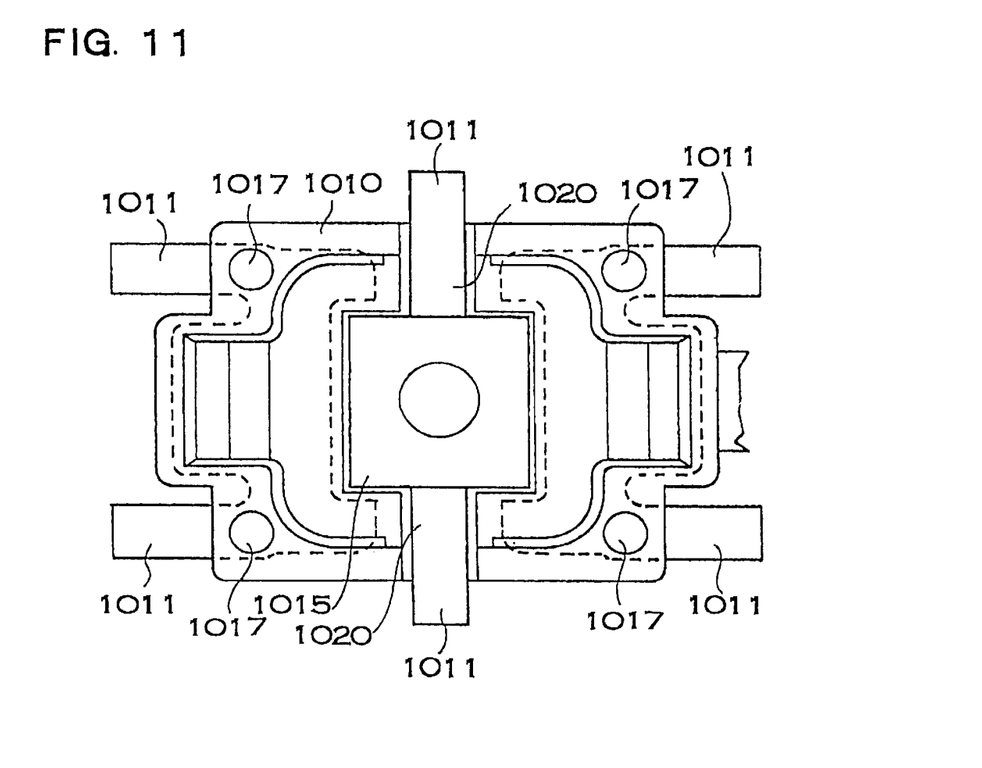
FIG. 11 is a plan view showing the internal structure of the circuit breaker shown in FIG. 10.

The circuit breakers 84, 94, 104 shown in FIGS. 8 through 11 are provided with resistive heating elements 815, 915, 1015 to heat the current shut off contacts 814, 914, 1014. A resistive heating element 815, 915, 1015 heats the current shut off contact 814, 914, 1014 to switch the circuit breaker 84, 94, 104 off. Consequently the resistive heating element 815, 915, 1015 is disposed in a thermally coupled fashion with the current shut off contact 814, 914, 1014. The resistive heating element 815, 915, 1015 is connected to a pair of control leads 820, 920, 1020. The control leads 820, 920, 1020 are connected to solder terminals 811, 911, 1011 which project outside the casing 810, 910, 1010. As shown in FIGS. 8, 9, and 11, control leads 820, 920, 1020 are connected to solder terminals 811, 911, 1011 which project outward from both sides of the circuit breaker 84, 94, 104. This configuration of circuit breaker 84, 94, 104 has the characteristic that it can be mounted more reliably to the printed circuit board via solder terminals 811, 911, 1011 projecting from both ends and both sides of the circuit breaker 84, 94, 104. However, although not illustrated, the pair of control leads may also be configured with one side connected inside the casing to the fixed contact and only the other control lead brought outside the casing. Solder terminals may be configured to give this circuit breaker a three terminal structure. In addition, a lead may be established projecting outward from the middle of the circuit breaker casing, and a control lead may also be connected to that lead.

The resistive heating element 815, 915, 1015 for heating the current shut off contact 814, 914, 1014 is a device which generates heat by Joule heating when current flows. A PTC, resistor, and thermistor are resistive heating elements. Since a PTC rapidly rises in temperature to its specified temperature, it has characteristics ideal for a resistive heating element 815, 915, 1015. Further, since PTC resistance abruptly increases to reduce current flow when the specified temperature is reached, it has the characteristic that it can greatly reduce power consumption losses. Consequently, the PTC is an optimum resistive heating element 815, 915, 1015.

In the circuit breakers 84, 94 shown in FIGS. 8 and 9, the resistive heating element 815, 915 is disposed at the end of the current shut off contact 814, 914 which is attached to the casing 810, 910. In the circuit breaker 84 of FIG. 8, the resistive heating element 815 is mounted in contact with the bottom surface of the current shut off contact 814. In the circuit breaker 94 of FIG. 9, the resistive heating element 915 is mounted under the thermally deforming plate 914B which is part of the current shut off contact 914. Thus, the resistive heating element 915 and the current shut off contact 914 are thermally coupled.

In the circuit breaker 104 shown in FIG. 10, the resistive heating element 1015 is disposed at the center of the casing 1010, and both sides of the bottom of the resistive heating element 1015 are connected to solder terminals 1011 which are brought outside through both ends of the casing 1010. Further, the center of the resistive heating element 1015 of this circuit breaker 104 connects with the current shut off contact 1014. The current shut off contact 1014 has movable contacts 1016 attached to both ends. In FIG. 10, this current shut off contact 1014 is sandwiched from above and below by a casing 1010 pressure clasp 1018 and the resistive heating element 1015 which hold it in a prescribed position. The center region of the current shut off contact 1014 is attached to the pressure clasp 1018 or to the resistive heating element 1015. For example, the current shut off contact 1014 is attached by bonding it to the bottom surface of pressure clasp 1018 or to the upper surface of the resistive heating element 1015. In this type of configuration where the current shut off contact 1014 is pressed against the resistive heating element 1015 by the pressure clasp, even when the current shut off contact 1014 is switched to the off state, the elastically deforming current shut off contact 1014 is reliably pressed in contact with the resistive heating element 1015. Therefore, heat from the resistive heating element 1015 can be effectively transmitted to the current shut off contact 1014. As a result, when the current shut off contact 1014 is heated by the resistive heating element 1015 to trip the circuit breaker 104 and protect the system, the resistive heating element 1015 effectively heats the current shut off contact 1014, and heat generated by the resistive heating element 1015 can be reduced. This is particularly important, for example, in a protection circuit where the resistive heating element conducts via batteries. This is because battery discharge can be reduced and still maintain the current shut off contact in the off state.

Figure 15:
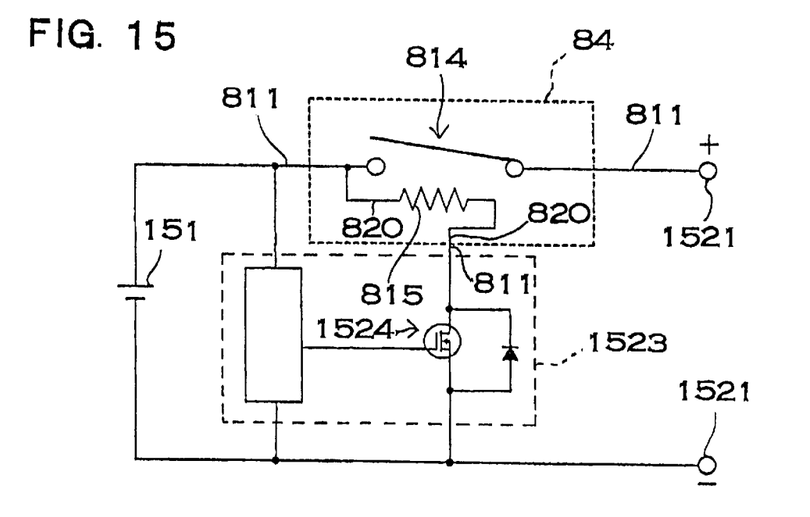
FIG. 15 is a circuit diagram showing one embodiment of a battery pack containing the circuit breaker shown in FIG. 8.
Figure 16:
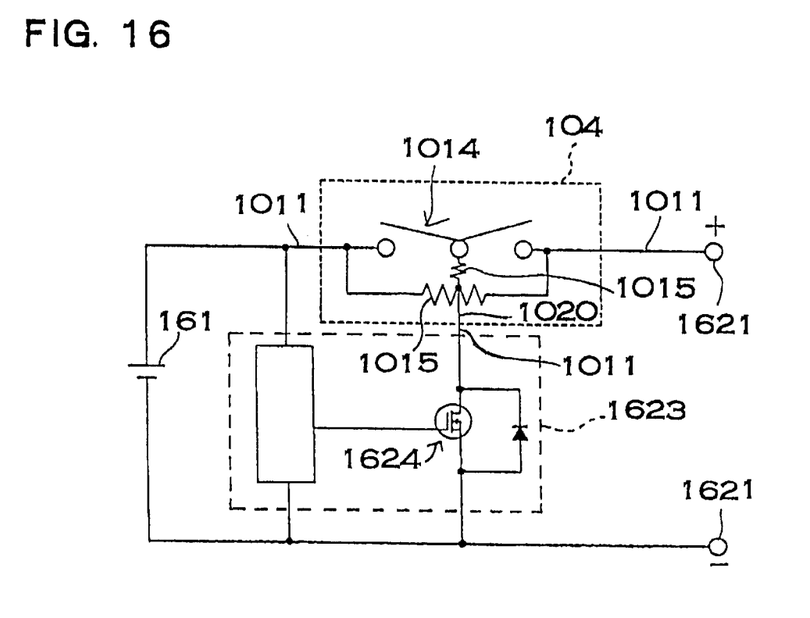
FIG. 16 is a circuit diagram showing one embodiment of a battery pack containing the circuit breaker shown in FIG. 10.

An embodiment of a battery pack containing the circuit breaker shown in FIG. 8 is shown in the circuit diagram of FIG. 15, and an embodiment of a battery pack containing the circuit breaker shown in FIG. 10 is shown in the circuit diagram of FIG. 16. In the battery packs shown in these circuit diagrams, a circuit breaker 84, 104 is connected in series between the batteries 151, 161 and an output terminal 1521, 1621. The circuit breaker 84, 104 is connected in series with the batteries 811, 1011 with one solder terminal 811, 1011 connected to the batteries 151, 161 and the other solder terminal 811, 1011 connected to an output terminal 1521, 1621. When the circuit breaker 84, 104 shuts off, the output terminal 1521, 1621 becomes disconnected from the batteries 151, 161 and battery 151, 161 current is cut off.

When current flows through the resistive heating element 815, 1015, it generates heat by Joule heating to switch the current shut off contact 814, 1014 off. Heating of the resistive heating element 815, 1015 is controlled by a voltage detection circuit 1523, 1623. Consequently, the resistive heating element 815, 1015 is connected to the switching device 1524, 1624 of the voltage detection circuit 1523, 1623. When the switching device 1524, 1624 turns on, current flows through the resistive heating element 815, 1015, and the resistive heating element 815, 1015 generates heat by Joule heating due to that current flow. The heat generating resistive heating element 815, 1015 heats the current shut off contact 814, 1014 and switches the circuit breaker 84, 104 off. Consequently, when the current shut off contact 814, 1014 is switched off, the voltage detection circuit 1523, 1623 switching device 1524, 1624 is on.

In the circuit breakers 84, 104 shown in FIGS. 15 and 16, after the current shut off contact 814, 1014 has been switched off, the current shut off contact 814, 1014 is still heated by the resistive heating element 815, 1015 to maintain the off state. The circuit breaker 84, 104 has a self protection mechanism. This is because the control lead 820, 1020 on one side of the resistive heating element 815, 1015 is connected to the batteries 151, 161. In this battery pack, even after the current shut off contact 814, 1014 is switched off, current is supplied to the resistive heating element 815, 1015 from the batteries 151, 161 as long as the switching device 1524, 1624 is on. When battery 151, 161 voltage drops and the switching device 1524, 1624 turns off, current no longer flows through the resistive heating element 815, 1015, the resistive heating element 815, 1015 no longer generates heat, and the current shut off contact 814, 1014 resets from off to on.

In circuit breakers 44, 54, 64, 74, 84, 94, 104 configured as described above, the current shut off contact 414, 514, 614, 714, 814, 914, 1014 can be Joule heated by current flowing through the current shut off contact 414, 514, 614, 714, 814, 914, 1014 itself, or it can be heated by heat discharged from the batteries, or it can be heated by conduction from the resistive heating element 815, 915, 1015. In any case, when heated above a set temperature, the movable contact 416, 516, 616, 716, 816, 916, 1016 switches off. For example, if the batteries short circuit, high currents flow through the current shut off contact 414, 514, 614, 714, 814, 914, 1014. In this case, the current shut off contact 414, 514, 614, 714, 814, 914, 1014 generates heat due to high current Joule heating and switches off to cut off the current when the temperature exceeds the set temperature. The case where the current shut off contact 414, 514, 614, 714, 814, 914, 1014 switches off due to heat from the resistive heating element 815, 915, 1015 is when the switching device 1524, 1624 turns on and current flows through the resistive heating element 815, 915, 1015.

Figure 12:
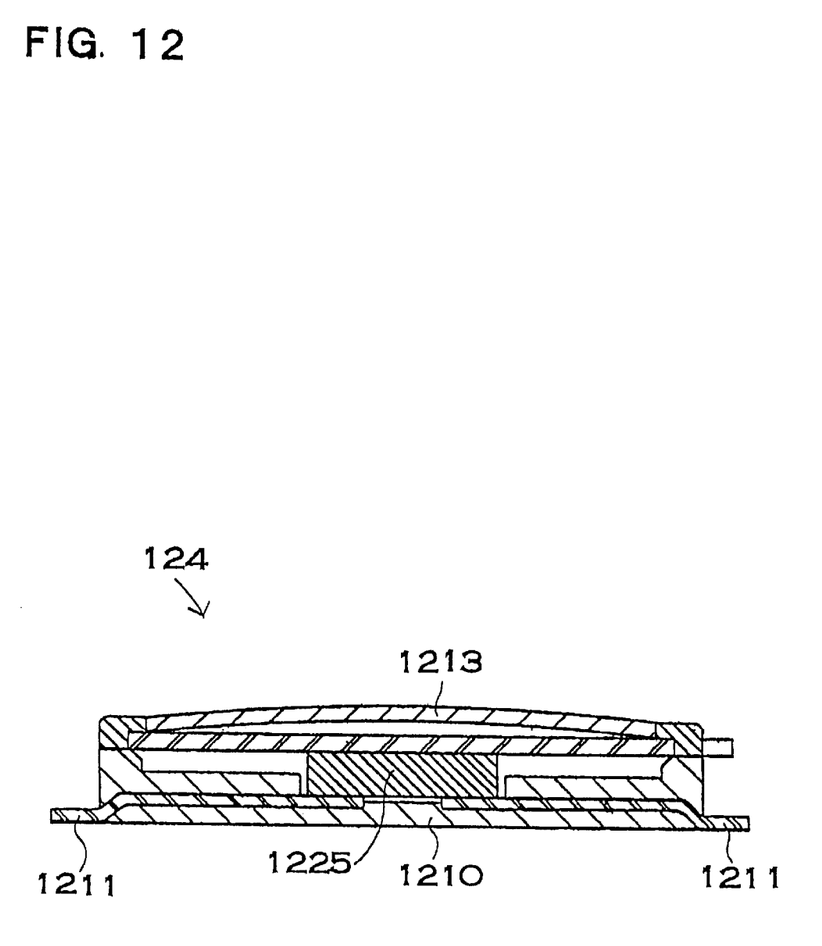
FIG. 12 is a cross-section view showing another embodiment of a circuit breaker housed inside a battery pack.

Turning to the circuit breaker 124 shown in FIG. 12, a current shut off device 1225, which shuts off current when temperature exceeds a specified temperature, is housed inside the casing 1210. The current shut off device 1225 is a PTC or fuse. In addition to being able to quickly rise in temperature to a specified temperature, PTC resistance abruptly increases when the specified temperature is reached. Since this reduces current flow, losses due to power consumption are greatly reduced. This makes the PTC most suitable as a current shut off device 1225. Both ends of the current shut off device 1225 of the circuit breaker 124 shown in FIG. 12 are connected to solder terminals 1211 which are brought outside both ends of the casing 1210. In this circuit breaker 124, the current shut off device 1225 is Joule heated by current flowing through the current shut off device 1225 itself, or it is heated by heat discharged from the batteries. In either case, when temperature rises above the specified temperature, current is shut off.

Figure 17:
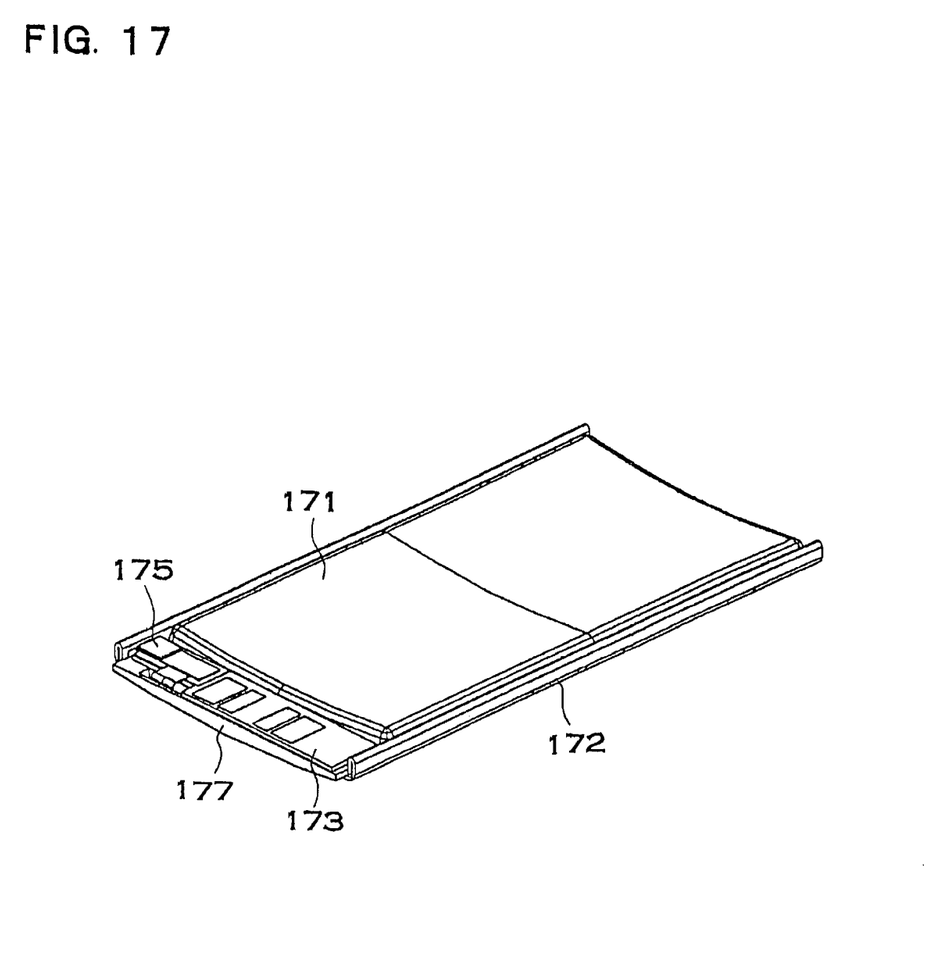
FIG. 17 is an oblique view of another embodiment of a battery pack of the present invention.
Figure 18:
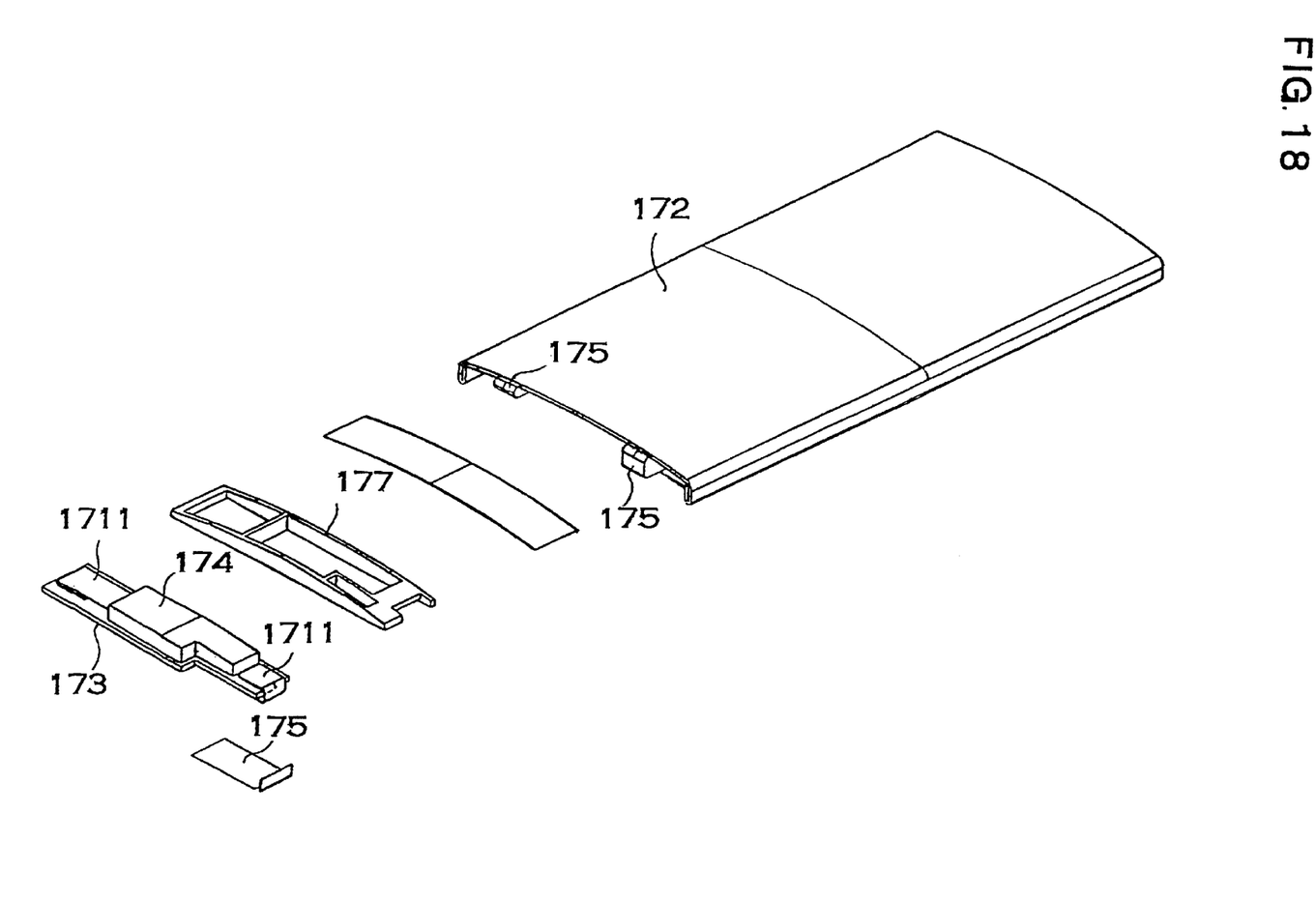
FIG. 18 is an exploded oblique view of the battery pack shown in FIG. 17 as seen from below.

In the battery packs described above, the printed circuit board 3, 33, 133, 143 is disposed inside the case 2, 32, 132, 142 with the side of the printed circuit board 3, 33, 133, 143 with the circuit breaker 4, 34, 64 mounted on it facing the end plane of the batteries 1, 31, 131, 141. However, the battery pack of the present invention may also be configured as shown in FIGS. 17 and 18. In the battery pack shown in these figures, the printed circuit board 173 is disposed perpendicular to the end plane of thin outline batteries 171 which are polymer batteries, housed inside the case 172. As shown in the exploded oblique view of FIG. 18, the circuit breaker 174 is mounted on the surface of the printed circuit board 173. The circuit breaker 174 is mounted on the printed circuit board 173 by solder re-flow at the solder terminals 1711. The printed circuit board 173 is aligned in position inside the case 172 via the holder 177. Finally, the printed circuit board 173 is connected to the batteries 171 via leads 175 and fixed in a specified position inside the case 172.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery pack comprising:
    (1) a case;
    (2) batteries housed inside the case;
    (3) a printed circuit board disposed inside the case, having battery protection circuit components mounted on it, and connected to the batteries via leads; and
    (4) a circuit breaker contained inside the case, connected in series with the batteries, and which switches off to protect the batteries when excessive current flows in the batteries or when battery temperature exceeds a set temperature; and wherein
    (5) the circuit breaker has a casing and a solder terminal attached to the casing, said solder terminal is attached to the printed circuit board by solder re-flow, and the circuit breaker mounts in a fixed position inside the case via the printed circuit board.

2. A battery pack as recited in claim 1 wherein the circuit breaker includes at least one additional solder terminal, said solder terminals including solder terminals at both ends of said casing, respectively, attached to the printed circuit board by solder re-flow.

3. A battery pack as recited in claim 1 wherein the circuit breaker includes a lead attached to said casing, and the lead is connected to a battery electrode.

4. A battery pack as recited in claim 3 wherein the solder terminal is attached to the casing in the same plane as the bottom of the casing, and the lead projects out from the middle of the casing.

5. A battery pack as recited in claim 1 wherein the circuit breaker contains a current shut off contact.

6. A battery pack as recited in claim 5 wherein the current shut off contact is a thermally deforming metal plate which is a laminate of a plurality of metals with different thermal coefficients of expansion.

7. A battery pack as recited in claim 5 wherein the current shut off contact has a movable contact, a fixed contact is provided in a position opposite the movable contact, the fixed contact is connected to a solder terminal, when the current shut off contact is heated, it deforms in a direction separating the movable contact from the fixed contact for the off state, and when the current shut off contact is not heated, it holds a position to keep the movable contact in touch with the fixed contact.

8. A battery pack as recited in claim 7 wherein movable contacts are provided at both ends of the current shut off contact.

9. A battery pack as recited in claim 5 wherein the center region of the current shut off contact is attached to casing pressure clasps.

10. A battery pack as recited in claim 1 wherein the circuit breaker is provided with a resistive heating element to heat the current shut off contact, and the resistive heating element heats the current shut off contact to switch the circuit breaker off.

11. A battery pack as recited in claim 10 wherein said circuit breaker includes at least one control lead connected to said solder terminal and to the resistive heating element.

12. A battery pack as recited in claim 11 wherein the circuit breaker includes at least one additional solder terminal and at least one additional control lead, said solder terminals include solder terminals projecting outside the casing, and said control leads are connected to respective ones of said solder terminals projecting from both sides of the casing, and the circuit breaker is attached to the printed circuit board via ones of said solder terminals that are projecting from both ends and from both sides of the casing.

13. A battery pack as recited in claim 10 wherein the circuit breaker has a self protection mechanism when the current shut off contact is switched to the off state, and the off state is maintained by heating of the current shut off contact by the resistive heating element.

14. A battery pack as recited in claim 1 wherein the circuit breaker contains a current shut off device, and this current shut off device is a PTC.

15. A battery pack as recited in claim 1 wherein the circuit breaker contains a current shut off device, and this current shut off device is a fuse.

16. A battery pack as recited in claim 1 wherein the printed circuit board has output terminals mounted on it, and the circuit breaker is electrically connected between the output terminals and the batteries.

17. A battery pack as recited in claim 1 wherein the printed circuit board is disposed in a fixed position facing the battery surfaces, a gap is established between the batteries and the printed circuit board, the circuit breaker is disposed in this gap, and the surface of the circuit breaker casing is put in close proximity to a battery surface.

18. A battery pack as recited in claim 1 wherein the printed circuit board is disposed in a fixed position at the battery surfaces via a holder.

19. A battery pack as recited in claim 18 wherein the holder has an insertion section to retain the printed circuit board in a fixed position, and the printed circuit board is inserted in the insertion section and held in a fixed position.

20. A battery pack as recited in claim 1 wherein the printed circuit board is bonded to the batteries to mount in a fixed position via thermal conducting resin.

21. A battery pack as recited in claim 20 wherein the side of the printed circuit board with the circuit breaker attached faces the batteries, and the circuit breaker is bonded to the batteries via thermal conducting resin.

22. A battery pack as recited in claim 1 wherein the circuit breaker is disposed in direct contact with a battery surface.

23. A battery pack as recited in claim 1 wherein one part of the casing is flexible metal plate, this flexible metal plate resiliently projects outward and elastically presses against a battery surface.

24. A battery pack as recited in claim 23 wherein the flexible metal plate has an overall curved shape and the center region resiliently projects outward.

25. A battery pack as recited in claim 1 wherein said solder terminal is in the same plane as the bottom of the casing, the solder terminal projects outside the casing, and the solder terminal is attached to the printed circuit board by solder re-flow.

26. A battery pack as recited in claim 1, wherein said circuit breaker includes at least one additional solder terminal.

27. A battery pack as recited in claim 26, wherein a plurality of said solder terminals are attached to the printed circuit board by solder reflow.

* * * * *